United States Patent [19]

Deitrich et al.

[11] Patent Number: 5,042,429
[45] Date of Patent: Aug. 27, 1991

[54] VENTILATED CAGE AND RACK SYSTEM

[75] Inventors: Eric A. Deitrich, Woodbine; John E. Sheaffer, Perryville, both of Md.

[73] Assignee: Lab Products, Inc., Maywood, N.J.

[21] Appl. No.: 302,161

[22] Filed: Jan. 25, 1989

[51] Int. Cl.$^5$ .............................................. A01K 1/00
[52] U.S. Cl. ......................................... 119/15; 119/18
[58] Field of Search ..................... 119/17, 18, 15, 72, 119/72.5

[56] References Cited

U.S. PATENT DOCUMENTS

| | | | |
|---|---|---|---|
| 3,630,174 | 12/1971 | Runkle et al. | 119/15 |
| 3,877,420 | 4/1975 | Eagleson, Jr. | 119/17 X |
| 4,085,705 | 4/1978 | Gland et al. | 119/17 |
| 4,249,482 | 2/1981 | Harr | 119/17 |
| 4,284,036 | 8/1981 | Hostetler | 119/72.5 |
| 4,343,261 | 8/1982 | Thomas | 119/17 X |
| 4,365,590 | 12/1982 | Ruggieri et al. | 119/17 X |
| 4,402,280 | 9/1983 | Thomas | 119/17 X |
| 4,528,941 | 7/1985 | Spengler | 119/17 X |
| 4,690,100 | 9/1987 | Thomas | 119/17 X |
| 4,699,088 | 10/1987 | Murray et al. | 119/18 |
| 4,881,569 | 11/1989 | Fournier et al. | 119/18 |

Primary Examiner—Robert P. Swiatek
Assistant Examiner—Todd E. Manahan
Attorney, Agent, or Firm—Blum Kaplan

[57] ABSTRACT

A ventilated age and rack system having an enclosed ventilated rack and a plurality of barrier cages on the shelves of the rack includes a liquid manifold for transporting a liquid to a plurality of predetermined positions along the shelves. A drinking valve is positioned within the cage to allow an animal to consume liquid supplied by the liquid manifold without leaving the cage. A coupling couples the liquid manifold to the drinking valve so that liquid may flow from the liquid manifold to within the cage when the cage is placed in the rack at the predetermined positions. An air plenum transports positive pressure air to the plurality of predetermined positions. A recessed grommet having holes therein is positioned in the bottom of each cage and allows air to pass from the air plenum to within the cage.

35 Claims, 4 Drawing Sheets

VENTILATED CAGE AND RACK SYSTEM

BACKGROUND OF THE INVENTION

This invention is generally directed to an improved ventilated cage and rack system, and in particular, to a ventilated cage and rack system which supplies air and water to an animal cage within a rack system.

An animal cage which supplies air directly to the cage is known in the art as illustrated in U.S. Pat. No. 4,593,650. This cage includes a cage bottom and cage bonnet. The cage bonnet has an open top with a filter extending across the top to allow the exhaust of gases. A filter having a tubular fitting connected to a pressurized air source is supported in the filter bonnet to provide pressurized air into the cage. This prior art cage has been less than satisfactory. The cage suffers from the disadvantage that a water supply must be provided within the cage necessitating the opening of the cage periodically to provide a water supply to the test animal thereby increasing the chances for contamination of the test animal by reducing the amount of isolation of the animals in the cage. Additionally, the heavier particles such as ammonia are less likely to be forced out of the cage because the air is forced through the top half of the cage and not the bottom where the heavier ammonia particles are located.

A ventilated rack system is known in the art as illustrated in U.S. Pat. No. 4,365,590. This rack system includes a hollow housing having a plurality of shelves for supporting cage level barrier cages therein. A low pressure air plenum extending along one side of the cage rack communicates with one side of each of the shelf compartments. The other side of the rack system includes a filtered airport in the openings which communicates with the room interior to provide a low pressure negative air flow across animal cages. Additionally, the a watering system is provided to dispense water through individual valves provided outside the individual animal cages. This ventilated rack has been less than satisfactory. It suffers from the disadvantage that it does not simultaneously provide air into the animal cage. Additionally, because the water is delivered outside of the cage, the animal must extend its head outside of the isolated cage area exposing itself to the environment and possible contamination.

Both the prior art ventilated cage and prior art ventilated rack suffer from the additional shortcomings that humidity, ammonia and carbon dioxide generated by the animal build up within the cage affecting the animal.

Accordingly, a combined ventilated cage rack system which is of simple structure and prevents the build up of ammonia, humidity and carbon dioxide within the cage and its escape into the room is desired.

SUMMARY OF THE INVENTION

Generally speaking, in accordance with the instant invention, a ventilated cage and rack system for providing both air ventilation and drinking water directly to animals within a cage level barrier is provided. An air plenum supplies air to a plurality of predetermined positions along each shelf within a rack. An animal barrier cage includes a bottom portion having upstanding sidewalls and bonnet. A filtering vent is disposed within the sidewall for passing positive pressurized air from the air plenum to the cage. A docking cone affixed to the plenum at each predetermined position couples the air plenum to the barrier cage to allow air flow therebetween when the cage is positioned at the predetermined position.

In another embodiment, a water manifold contained within the air plenum provides water at the predetermined position along the shelf. A drinking valve disposed within the vent receives the water. A quick release coupling connects the water manifold with the drinking valve.

Accordingly, it is an object of the instant invention to provide an improved ventilated cage rack system.

A further object of the invention is to provide a ventilated cage rack system in which both air ventilation and drinking water are directly supplied to the animal within the microenvironment thus eliminating the potential compromise of the barrier system and animal health.

Another object of the invention is to provide a ventilated cage rack system which reduces the levels of ammonia, carbon dioxide and humidity contained within the barrier cage.

Yet another object of the invention is to provide a ventilated cage rack system in which the cage ventilation system is not dependent on the ventilated rack exhaust system to maintain isolation of the animal.

Still other objects and advantages of the invention will in part be obvious and in part will be apparent from the specification.

The invention accordingly, comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention reference is mode to the following description taken in connection with the accompanying drawings in which.

REFERENCE DESCRIPTION OF THE PREFERRED EMBODIMENTS

Figure 1:
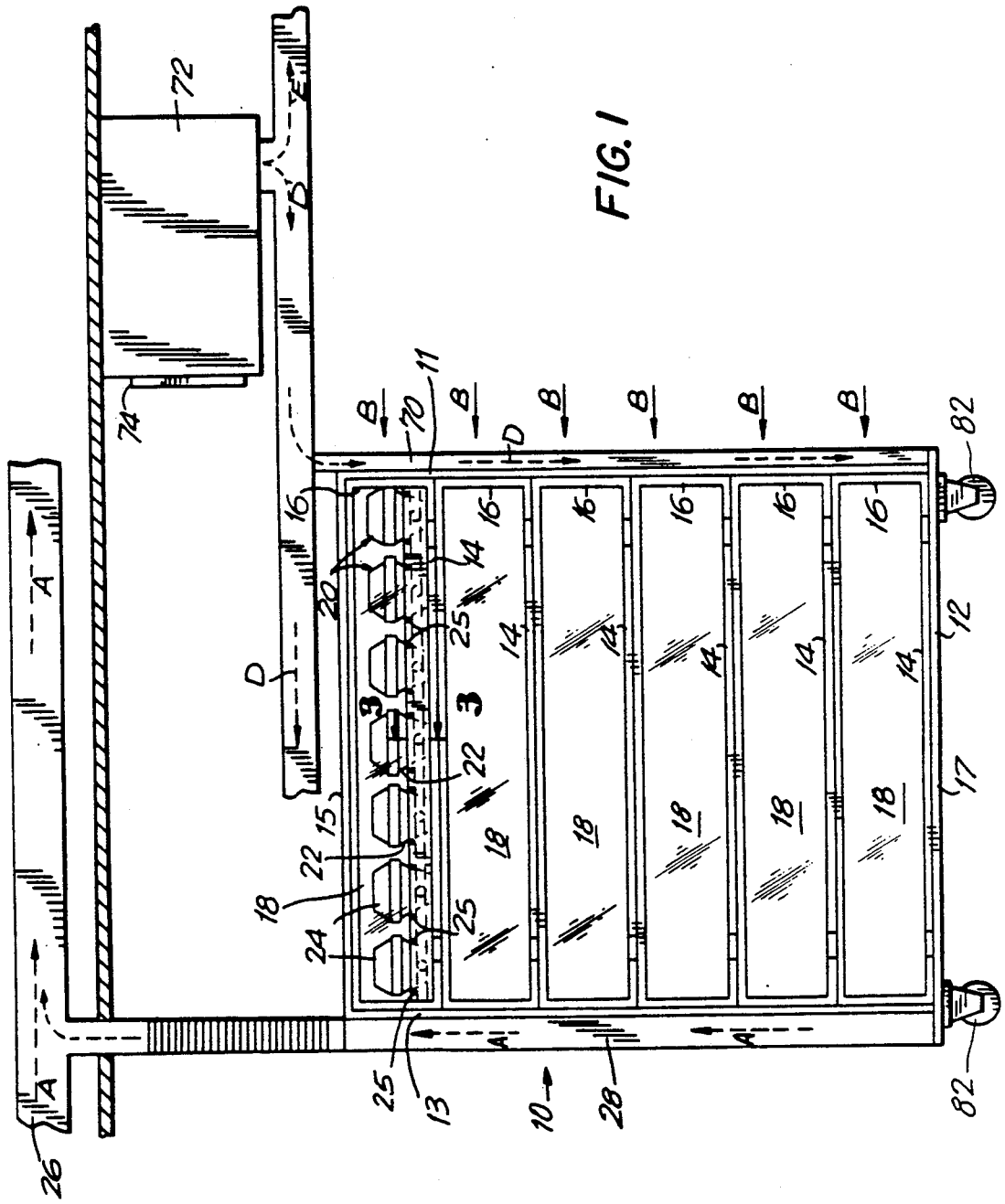
FIG. 1 is a front elevational view of a ventilated cage and rack system constructed in accordance with a preferred embodiment of the invention.

Reference is first made to FIG. 1, wherein a ventilated cage and rack system, generally indicated at 10, constructed in accordance with the invention is shown. Ventilated cage and rack system 10 includes a rack 12 having a left side wall 11 and a right side wall 13, a top 15, a bottom 17 and a backwall. A plurality of shelves 14 are disposed in parallel between side walls 11 and 13. A door 16 is disposed at the front of rack 12 at each respective shelf 14 to allow access to each individual shelf 14 providing an enclosed rack. In an exemplary embodiment, each door 16 is provided with a window 18 to allow observation of the items contained within the rack without opening a door, thus limiting chances of contamination of personnel by the animals which are housed within ventilated cage and rack system 10.

A plurality of cage level barriers 20 are positioned within rack 12 on shelves 14. Each barrier cage 20 is formed of a bottom 22 and a filter bonnet 24. Bonnet 24 is an open top bonnet having a filter therein of the type disclosed in U.S. Pat. No. 4,480,587. Cages 20 are positioned within rack 12 by cage guides positioning rods 25 extending from a back wall of rack 12. Cage guide 25 are positioned in pairs at a distance slightly greater than the width of cages 20.

Rack 12 is a ventilated rack drawing air across the top of each cage 20. A building exhaust 26 provides a negative pressure air flow. An air exhaust plenum 28 communicates with each shelf 14 and with building exhaust 26 to act as a rack exhaust providing a negative pressure air plenum drawing air from rack 10 through right wall 13 in the direction of arrows A. This negative pressure causes room air to be drawn in the direction of arrows B through filter openings provided in right wall 13 thus providing a continuous stream of filtered air across cages 20 providing a ventilated rack.

Figure 2:
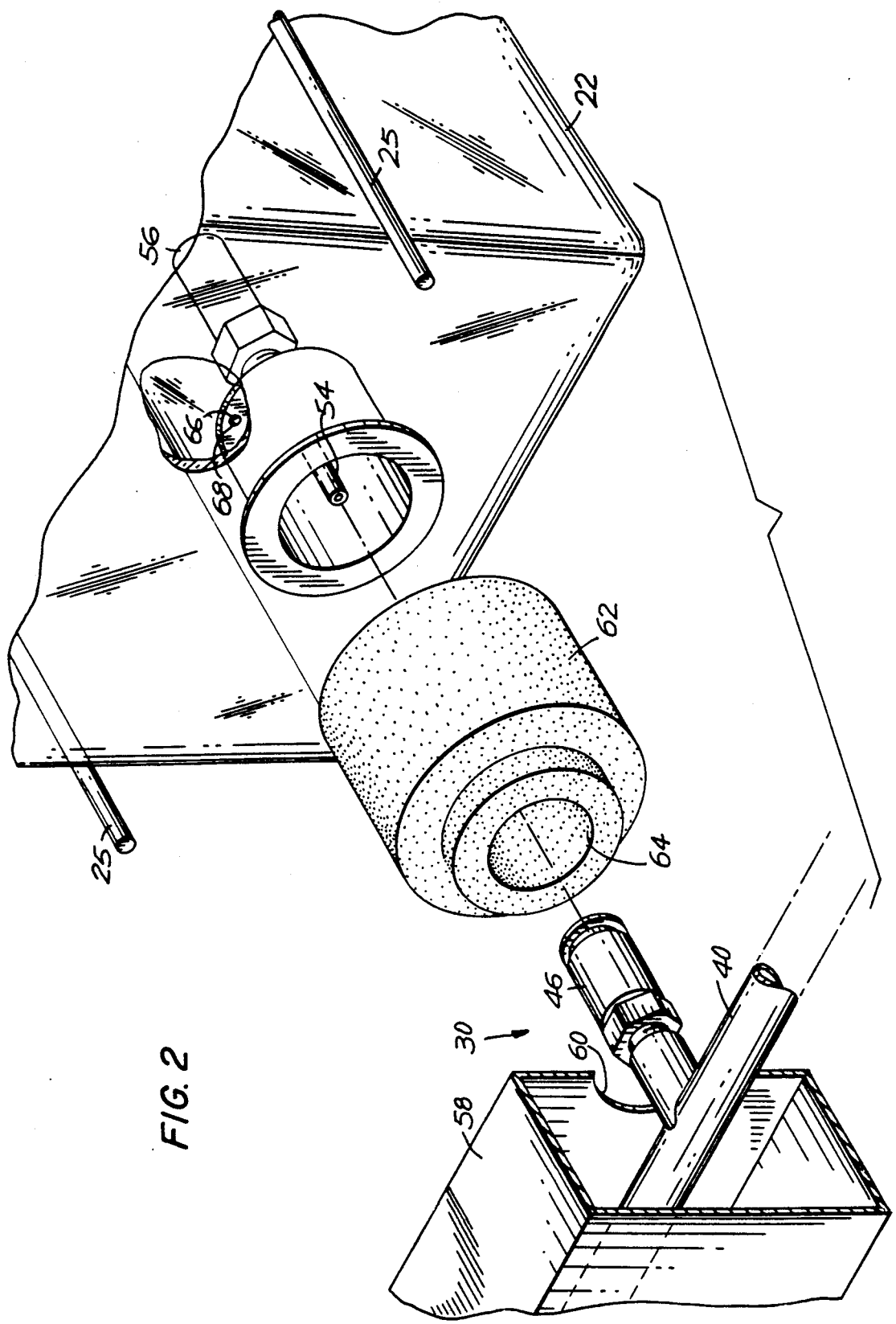
FIG. 2 is an exploded view of the coupling between the cage and rack of the ventilated cage and rack system.
Figure 4:
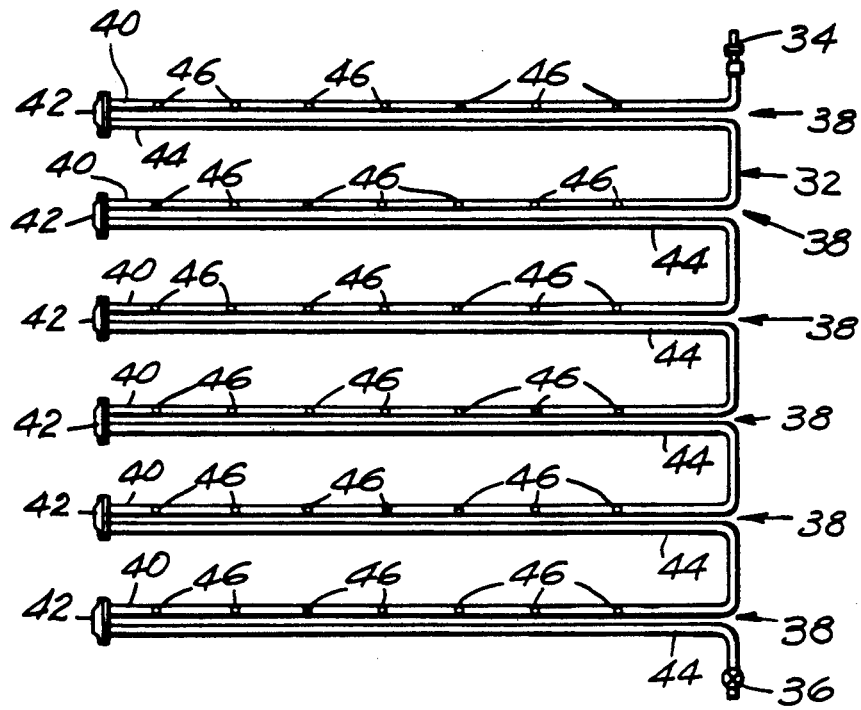
FIG. 4 is a front elevational view of a water manifold constructed in accordance with the invention.
Figure 5:
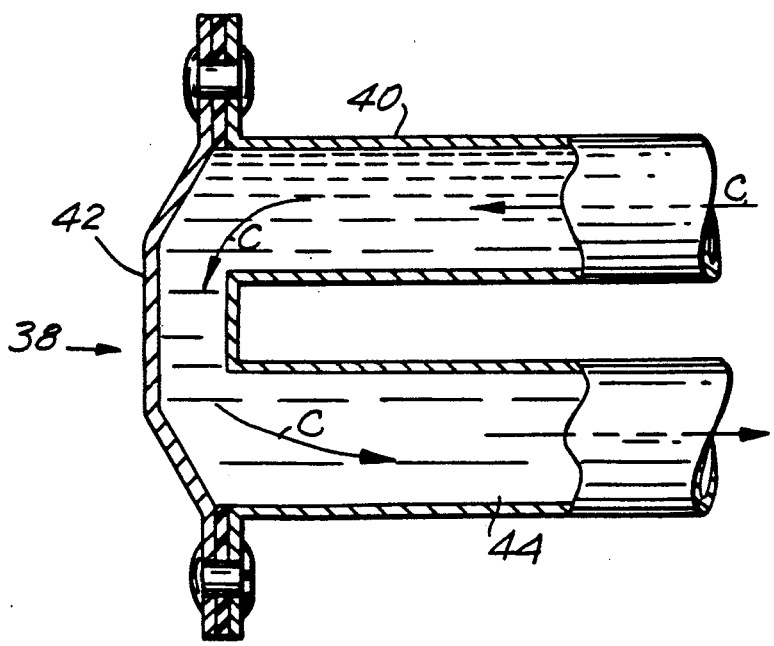
FIG. 5 is a fragmented sectional view of the water manifold of FIG. 4.

Reference is now also made to FIGS. 2, 4 and 5 wherein a transporting structure, generally indicated at 30, for providing water and air to each individual cage 20 is provided. Transporting structure 30 includes a water manifold 32 for delivering water to each cage 20. Water manifold 32 includes a water source 34 at one end and drain 36 at its opposite end to provide a water flow path. Water manifold 32 traces a generally serpentine path, as shown in FIG. 4, within rack 12 so that each pipe pair, generally indicated at 38, formed by a first pipe 40 and a second pipe 44 is disposed adjacent and parallel to a respective shelf 14. Pipe pairs 38 are formed by an elbow 42 forming a water path between first pipe 40 and second pipe 44. Water travels from first pipe 40 through elbow 42 to second pipe 44 in a direction indicated by arrows C of FIG. 5 allowing water entering from source 34 to pass each cage 20 of each shelf 14 contained within rack 12. A number of female valve couplings 46 at least equal to the number of cages 20 positioned within rack 12 extend from first pipe 40 towards cage 20 at predetermined intervals.

Each cage bottom 22 is formed by a floor 48 and wall 50. A recessed air diffuser 52 is formed in wall 50. A drinking valve 56 extends from recessed air diffuser 52 within cage 20. A male coupling valve 54 extends from recessed air diffuser 52 without cage bottom 22 and is in fluid communication with drinking valve 56. Male coupling valve 54 is dimensioned to be received by female coupling valve 46 causing female coupling valve 46 to open, thus allowing water to flow from pipe 40 to drinking valve 56.

An air plenum 58 is disposed about water manifold 32 and traces a path along water manifold 32. An opening 60 is formed within air plenum 58 at each female coupling valve 46 to allow female coupling valve 46 to extend therethrough. A docking cone 62 includes a docking section 61 for coming in contact with wall 50 and a securing section 63 positioned within plenum 58 having an outer radius greater than the inner radius of opening 60 to secure docking cone 62 to air plenum 58. The inner circumference 64 of docking cone 62 is greater than the outer diameter of pipe 40 or female coupling valve 46 to allow room for air to pass through docking cone 62.

Air plenum 58 includes an input plenum section 70 along left wall 11 of rack 12 which is connected to a cage air supply unit 72 which intakes intakes room air through a room air intake 74 filters the air through a medium such as a HEPA filter, and provides a positive pressure airflow in a direction of arrows D and E providing a positive pressure airflow through plenum 58 to each cage 20. The rack exhaust system driven by building exhaust 26 is distinct and independent from the cage exhaust system powered by cage air supply unit 72. Accordingly, a failure in the rack ventilation system will not affect the status of each cage 20. Additionally, a failure in cage air supply unit 72 will result in ventilated cage and rack system 10 behaving as the prior art maintaining the status of each cage 20 for a limited period of time.

Figure 3:
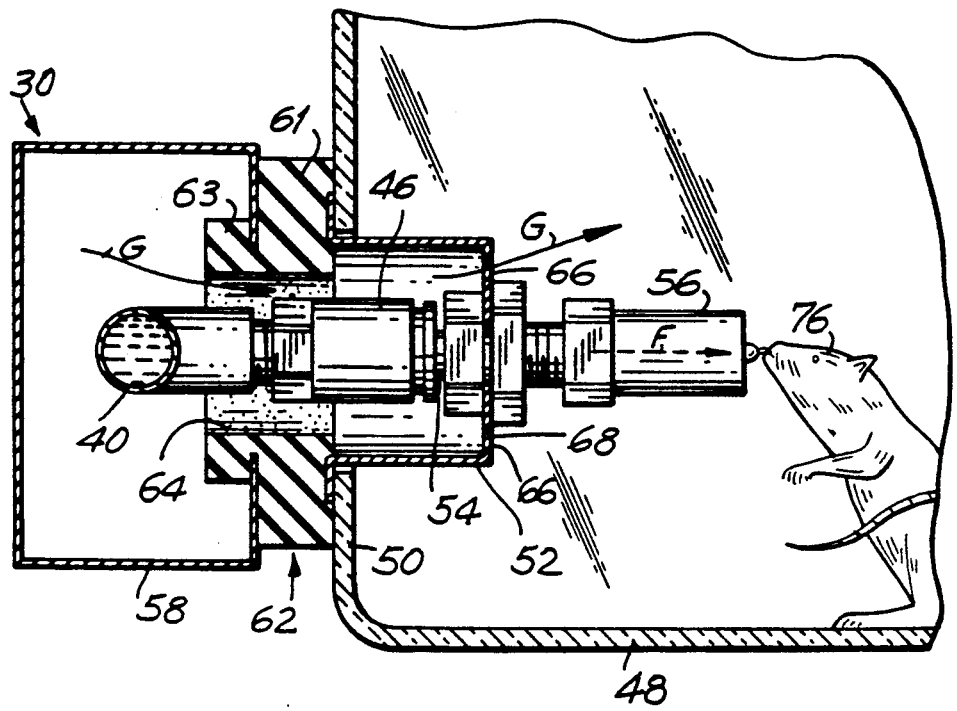
FIG. 3 is an enlarged sectional view taken along line 3—3 of FIG. 1.

Reference is now made to FIG. 3 in which operation of ventilated cage and rack system 10 is defined. Female coupling valve 46 is positioned at a height to receive male coupling valve 54 when cage 20 is slid into position resting on a shelf 14. The insertion of male coupling valve 54 opens female coupling valve 46 providing water flow from pipe 40 to drinking valve 56. Drinking valve 56 remains closed until pressure is applied thereon by an animal 76 when drinking, causing water to flow in the direction of arrow F. By providing water within each individual cage 20 upon drinking by each individual animal 76, cross contamination caused by spilling of drinking water or the animal coming in contact with the environment without cage 20 is severely reduced.

Docking cone 62 is compressible in the axial direction, and provides a restorative force as it attempts to expand against cage 20. When cage 20 is pushed towards air plenum 58 to engage female couple 46 with male coupling valve 54 docking cone 62 is compressed therebetween to form a substantially air tight gasket seal. Accordingly, filtered air flows in the direction of arrows G through openings 66 of recessed air diffuser 52. The cage barrier is maintained with a filter 68 placed behind openings 56. The air, because it is under positive pressure, forces the air in cage 20 out of cage 20 through a filter top, known in the art, provided in bonnet 24. Additionally, because air enters cage 20 through bottom wall 55 of 22, it pushes the heavier ammonia and carbon dioxide particles which nestle at the bottom of cage 20 before the air and out through bonnet 24, thus reducing ammonia, carbon dioxide and humidity within the cage, and better maintaining the status of the animals continued therein.

Positioning cage guides 25 also act to align male coupling valve 54 with female coupling valve 46. Cage guides 25 are provided at positions corresponding to female coupling valve 46 aligning with male coupling valve 54. Make coupling valve 54 opens female coupling valve 46 by insertion therein. Additionally, it is a simple friction fit which retains male coupling valve 54 within female coupling valve 46. Therefore, a slight amount of pressure in a direction coaxial with male coupling valve 54 connects or disconnects male coupling valve to or from female coupling valve 46 thus providing a quick release mechanism not requiring the touching of either coupling valve, again reducing the occurrence of cross contamination as well as making the use of ventilated cage and rack system 10 more efficient and less time consuming.

To remove an individual cage 20 from rack 12, door 16 is opened and cage 20 is moved away from plenum 58. This disconnects male valve couple 54 from female valve couple 46 thus closing female valve couple 46 preventing any leakage of water and the resulting cross contamination. Because of the positive pressure cage air system in combination with the negative pressure rack system, any contamination air now in the rack is pulled through air exhaust plenum 28 and the status of the remaining cages 20 is not effected. Male coupling valve 54 does not extend beyond the surface of wall 50, allowing bottoms 20 to be stacked for storage within each other and making them more autoclavable.

Figure 6:
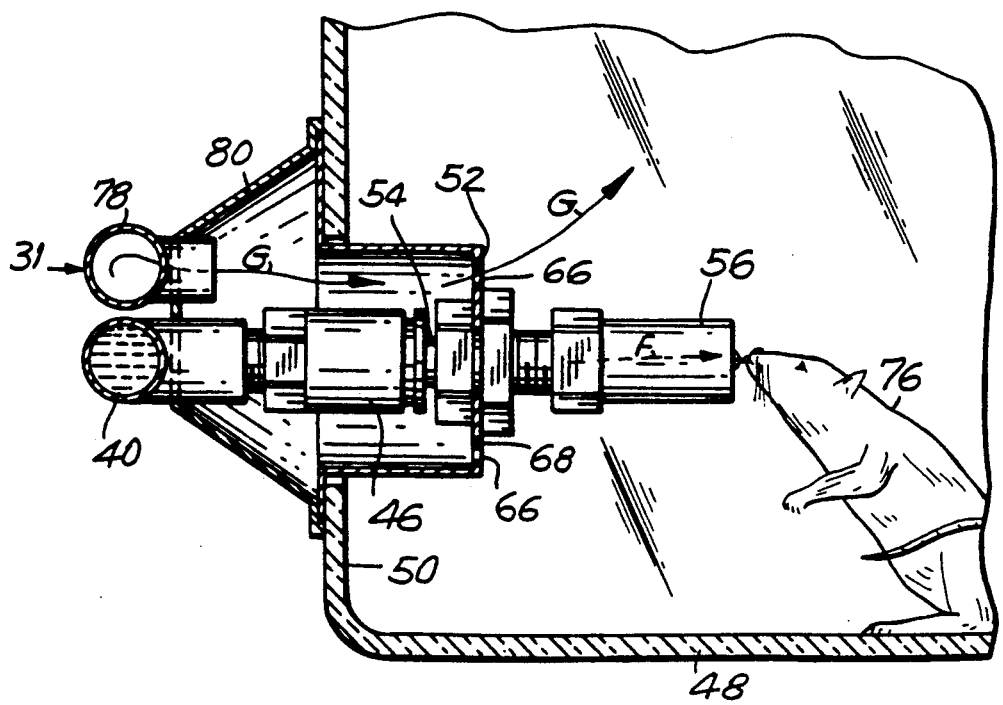
FIG. 6 is a fragmented sectional view of a cage positioned within a ventilated rack in accordance with a second embodiment of the invention.

Reference is now made to FIG. 6 to describe a second embodiment of ventilated cage and rack system 10. Like numerals are used to indicated like elements, the difference between the second embodiment and first embodiment being the separation of the air plenum from the water plenum. A transportation structure 31 includes a first pipe 40 having a female coupling valve 46 extending therefrom just as described above. An air plenum 78 communicates with cage air supply unit 72 and is disposed parallel to water manifold 32. A docking cone 80 is formed about both air plenum 78 and first pipe 40, providing a substantially air tight seal when cage 20 is positioned so that male coupling valve 54 is coupled with female coupling valve 46.

Again, positive air pressure is applied from air plenum 78 through opening 66 of recessed air diffuser 52 to provide air to individual cage 20 and force out ammonia, carbon dioxide and prevent humidity build up.

The above explanation has been provided in connection with a single sided ventilated rack of simplicity. However, the structure is equally applicable to a double sided ventilated rack in which the air plenum and water manifold are disposed between the mirrored sides of the double sided ventilated rack having docking cones and female coupling valves extending in both directions from the water manifold.

Additionally, in a exemplary embodiment, cage air supply unit 72 is ceiling mounted so that the entire air input and out take system is provided above each rack this by way of example only. A single ceiling mounted cage air supply unit can serve 10 to 12 distinct racks, thus allowing for the economy of space and maximization of the use of barrier cages in a single room. Rack 12 is mounted on wheels 82 to allow portability from one area to another. Also the use of female valve couplings as the connection to the water manifold is by way of example only. The female coupling valves may extend from the air diffuser to couple with a male coupling valve extending from the water manifold.

Accordingly, by providing a ventilated cage and rack system which delivers both air and water within each individual micro-isolated cage, cross contamination of animals is greatly reduced. Additionally, by providing positive pressure air at the bottom of each cage, the amount of ammonia, carbon dioxide and humidity build up is substantially reduced. By providing a quick release mechanism between the cage and air and water delivery system, the ease of use and efficiency of use is greatly enhanced.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A ventilated cage and rack system comprising an enclosed ventilated rack, said rack including a plurality of shelves therein, liquid transporting means for transporting a liquid to a plurality of predetermined positions along said shelves, a plurality of animal cages, drinking valve means fixedly disposed within each said cage for selectively allowing liquid to be consumed by an animal to be housed within said cage; and coupling means for releasably coupling said liquid transporting means to said drinking valve means when each said cage is placed on said rack at said predetermined position and disconnecting each said cage and drinking valve means from said rack when each said cage is removed form said rack, whereby said liquid transported within said liquid transporting means is delivered to said cage.

2. The ventilated cage and rack system of claim 1, wherein said ventilated rack includes negative pressure means for providing a negative air pressure within said enclosed ventilated rack.

3. The ventilated cage and rack system of claim 2, wherein said enclosed ventilated rack is formed with openings therein, said openings allowing air without said ventilated rack to pass within said ventilated rack and including filter means for filtering said air which passes from without said rack to within said rack; and said negative pressure means including a building exhaust for providing negative pressure, and an air exhaust plenum for coupling said ventilated rack to said building exhaust, whereby air travels from without said ventilated rack through said ventilated rack and said air exhaust plenum to said building exhaust.

4. The ventilated cage and rack system of claim 1, wherein said liquid transporting means is a water manifold, said water manifold forming a substantially serpentine pattern essentially parallel to each of said shelves of said ventilated cage and rack system, and further comprising a source for allowing water to enter said water manifold and a drain for allowing water to exit said water manifold.

5. The ventilated cage and rack system of claim 1, wherein each said cage is a cage level barrier.

6. The ventilated cage and rack system of claim 5, wherein each said cage includes a bottom portion having an upstanding sidewall, and a bonnet for releasably fitting upon said sidewall, said bonnet including an open filtered top.

7. The ventilated cage and rack system of claim 1, further including quick connect and disconnect means for coupling said liquid transporting means to said drinking valve means with the application of low pressure and allowing the disconnect of said liquid transporting means from said drinking valve means with application of low pressure.

8. The cage and rack ventilation system of claim 7, wherein said coupling means includes a female coupling valve extending from said liquid transporting means at each predetermined position.

9. The ventilated cage and rack system of claim 8, wherein said coupling means further includes a male coupling valve extending from said cage, the male coupling valve dimensioned to be received by said female coupling valve and said female coupling valve being closed until said male coupling valve is received.

10. The cage and rack ventilation system of claim 1, wherein said coupling means includes a female coupling valve extending from said liquid transporting means at each predetermined position.

11. The ventilated cage and rack system of claim 10, wherein said coupling means further includes a male coupling valve extending from said cage, the male coupling valve dimensioned to be received by said female coupling valve and said female coupling valve being closed until said male coupling valve is received.

12. The ventilated cage and rack system of claim 1, further comprising positioning cage guides affixed to said rack adjacent said predetermined positions spaced so as to receive said cage and guide said cage to said predetermined position.

13. A ventilated cage and rack system comprising a closed ventilated rack, said rack including a plurality of shelves therein, negative pressure means for providing a negative pressure within said enclosed ventilated rack, a water manifold for transporting water to a plurality of predetermined positions along said shelves, a female coupling valve extending from said water manifold at each of said predetermined positions at least one cage for housing an animal therein, a drinking valve fixedly disposed within said at least one cage for selectively allowing liquid to be consumed by said animal housed within said at least one cage, and a male coupling valve extending from said at least one cage for being received by said female coupling valve when said at least one cage is placed in said rack at one of said predetermined positions, whereby said water transported within said water manifold is transported to said drinking valve through the coupling of said female coupling valve and said male coupling valve.

14. A ventilated cage and rack system comprising an enclosed ventilated rack, said rack including a plurality of shelves therein, air transporting means for transporting air to a plurality of predetermined air positions along said shelves, at least one cage for housing at least one animal therein, said at least one cage being a cage level barrier having a bottom portion having an upstanding sidewall and a filter bonnet positioned on said sidewall, air transfer means disposed at a single predetermined position within said sidewall of said bottom portion of said at least one cage for transferring air from said air transporting means to within said at least one cage; and coupling means for coupling said air transporting means to said air transfer means whereby said air transported within said air transporting means is transported within said at least one cage at said single predetermined position within said sidewall.

15. The ventilated cage and rack system of claim 14, wherein said ventilated rack includes negative pressure means for providing a negative air pressure within said enclosed ventilated rack.

16. The ventilated cage and rack system of claim 15, wherein said enclosed ventilated rack is formed with openings therein, said openings therein for allowing air without said ventilated rack to pass within said ventilated rack and including filter means for filtering said air which passes from without said rack to within said rack, and said negative pressure means including a building exhaust for providing negative pressure and an air exhaust plenum for coupling said ventilated rack to said building exhaust, whereby air travels from without said ventilated rack through said ventilated rack sand aid air exhaust plenum to said building exhaust.

17. The ventilated cage and rack system of claim 14, wherein said air transporting means includes an air plenum, said air plenum forming a generally serpentine path adjacent said shelves.

18. The ventilated cage and rack system of claim 14, further comprising positive pressure means for providing a positive pressure within said air transporting means within said at least one cage when said at least one cage is positioned at said predetermined air positions.

19. A ventilated cage and rack system of claim 18, wherein said air transporting means includes an air plenum, said air plenum forming a generally serpentine path adjacent said shelves.

20. The ventilated cage and rack system of claim 19, wherein said positive pressure means includes a cage air supply unit connected to said air plenum.

21. The ventilated cage and rack system of claim 18, wherein said positive pressure means includes a filter for filtering said air transmitted to said at least one cage.

22. The ventilated cage and rack system of claim 14, wherein said air transfer means includes a recessed air diffuser within said at least one cage, said air diffuser including a plurality of openings formed therein.

23. The ventilated cage and rack system of claim 22, wherein said air transfer means further includes a filter positioned within said recessed air diffuser for filtering air transfer through said air transfer means.

24. The ventilated cage and rack system of claim 23, wherein said air transfer means includes a a filter for filtering said air transmitted to said cage.

25. The ventilated cage and rack system of claim 14, further comprising positioning cage guides affixed to said rack adjacent said predetermined positions spaced so as to receive said at least one cage and guide said at least one cage to said predetermined air position.

26. The ventilated cage and rack system of claim 14, further comprising liquid transporting means for transporting a liquid to a plurality of predetermined water positions along said shelves, drinking valve means fixedly disposed within said at least one cage for selectively allowing liquid to be consumed buy an animal housed within said at least one cage, and liquid coupling means for coupling said liquid transporting means to said drinking valve means when said at least one cage is placed in said rack at said predetermined water position and disconnecting said at least one cage and drinking valve means when said at least one cage is removed from said rack, whereby said liquid transported within said liquid transporting means is transported within said at least one cage.

27. The ventilated cage and rack system of claim 26, wherein said liquid transporting means is a water manifold, said water manifold forming a substantially serpentine pattern parallel to each of said shelves of said ventilated cage and rack system and including a source for allowing water to enter said water manifold and a drain for allowing water to exit said water manifold.

28. The ventilated cage and rack system of claim 26, further including quick connect and disconnect means for coupling said liquid transporting means to said drinking valve means with the application of low pressure and allowing the disconnection of said liquid transporting means from said drinking valve means with the application of low pressure.

29. The cage and rack ventilation system of claim 28, wherein said coupling means includes a female coupling valve extending from said liquid transporting means at each predetermined water position.

30. The ventilated cage and rack system of claim 29, wherein said coupling means further includes a male coupling valve extending from said at least one cage, the male coupling valve dimensioned to be received by said female coupling valve and said female coupling valve being closed until said male coupling valve is received.

31. The ventilated cage and rack system of claim 26, wherein said water manifold is disposed within said air plenum.

32. The ventilated cage and rack system of claim 26, wherein the predetermined air position is the same position as the predetermined water position.

33. A ventilated cage and rack system comprising an enclosed ventilated rack, said rack including a plurality of shelves therein, air transporting means for transporting air to a plurality of predetermined air positions along said shelves, at least one cage for housing at least one animal therein, said at least one cage being a cage level barrier having a bottom portion having an upstanding sidewall and a filter bonnet positioned on said sidewall, air transfer means disposed at a single predetermined position within said sidewall of said bottom portion of said at least one cage for transferring air from said air transporting means to within said at least one cage; and coupling means for coupling said air transporting means to said air transfer means whereby said air transported within said air transporting means is transported within said at least one cage at said single predetermined position within said sidewall; said coupling means including a compressible docking cone affixed to said air transporting mean and forming a substantially air tight seal about said air transfer means when said at least one cage is positioned at said predetermined air position.

34. A ventilated cage and rack system comprising an enclosed ventilated rack, said rack including a plurality of shelves therein, an air plenum for transporting air to a plurality of predetermined positions along said shelves, positive pressure means for providing a positive air pressure through said air plenum, at least one cage for housing at least one animal, said at least one cage including a bottom portion having an upstanding sidewall and a bonnet having an open filter top therein for resting upon said sidewall; a recessed air diffuser disposed within said sidewall of said bottom portion, said air diffuser having openings therein for allowing air to pass from without said at least one cage to within said at least one cage, a docking cone affixed to said air plenum at said predetermined positions, said docking cone forming a substantially air tight seal between said air plenum and said recessed air diffuser when said at least one cage is positioned at said predetermined position.

35. A ventilated cage and rack system comprising an enclosed ventilated rack, said rack including a plurality of shelves therein, air transporting means for transporting air to a plurality of predetermined air positions along said shelves, at least one cage for housing at least one animal therein, said at least one cage being a cage level barrier having a bottom portion having an upstanding sidewall and a filter bonnet positioned on said sidewall, air transfer means disposed at a single predetermined position within said sidewall of said bottom portion of said at least one cage for transferring air from said air transporting means to within said at least one cage; and coupling means for coupling said air transporting means to said air transfer means whereby said air transported within said air transporting means is transported within said at least one cage at said single predetermined position within said sidewall;

liquid transporting means for transporting a liquid to a plurality of predetermined water positions along said shelves, drinking valve means fixedly disposed within said at least one cage for selectively allowing liquid to be consumed by an animal housed within said at least one cage, and liquid coupling means for coupling said liquid transporting means to said drinking valve means when said at least one cage is placed in said rack at said predetermined water position and disconnecting said at least one cage and drinking valve means when said at least one cage is removed from said rack, whereby said liquid transported within said liquid transporting means is transported within said at least one cage;

further including quick connect and disconnect means for coupling said liquid transporting means to said drinking valve means with the application of low pressure and allowing the disconnection of said liquid transporting means from said drinking valve means with the application of low pressure;

wherein said coupling means includes a female coupling valve extending from said liquid transporting mean at each predetermined water position;

wherein said coupling means further includes a male coupling valve extending from said at least one cage, the male coupling valve dimensioned to be received by said female coupling valve and said female coupling valve being closed until said male coupling valve is received; and a recessed air diffuser and docking cone, wherein said female coupling valve extends within said docking cone and said male coupling valve extends from within said air diffuser.

* * * * *